United States Patent
Dawson et al.

(10) Patent No.: US 10,455,058 B2
(45) Date of Patent: Oct. 22, 2019

(54) CUSTOM DIGITAL COMPONENTS

(71) Applicant: Google LLC, Mountain View, CA (US)

(72) Inventors: Christopher Dawson, Mountain View, CA (US); Haskell Aaron Garon, Mountain View, CA (US); James Giles, Mountain View, CA (US); Vishal Viresh Kumar, Mountain View, CA (US); Stephen Rhys Norum, Mountain View, CA (US); George Jacob Levitte, Mountain View, CA (US)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 15/546,442

(22) PCT Filed: Feb. 2, 2017

(86) PCT No.: PCT/US2017/016220
§ 371 (c)(1),
(2) Date: Jul. 26, 2017

(87) PCT Pub. No.: WO2018/143990
PCT Pub. Date: Aug. 9, 2018

(65) Prior Publication Data
US 2018/0278719 A1    Sep. 27, 2018

(51) Int. Cl.
*H04L 29/08* (2006.01)
*G06F 9/451* (2018.01)
(Continued)

(52) U.S. Cl.
CPC .............. *H04L 67/34* (2013.01); *G06F 9/451* (2018.02); *G06F 9/547* (2013.01); *G06F 21/602* (2013.01); *H04L 67/20* (2013.01)

(58) Field of Classification Search
None
See application file for complete search history.

(56) References Cited

U.S. PATENT DOCUMENTS

| 9,092,732 B1* | 7/2015 | Faratin ................... G06Q 30/02 |
| 2015/0120470 A1* | 4/2015 | Roever ............. G06Q 30/0267 |
| | | 705/14.73 |

(Continued)

FOREIGN PATENT DOCUMENTS

WO    WO 03/009102    1/2003

OTHER PUBLICATIONS

PCT Written Opinion issued in International Application No. PCT/US2017/016220, dated Jan. 2, 2019, 9 pages.

(Continued)

*Primary Examiner* — Joshua Joo
(74) *Attorney, Agent, or Firm* — Fish & Richardson P.C.

(57) ABSTRACT

Methods, systems, and apparatus, including computer programs encoded on a computer storage medium, for processing requests for digital components. A method includes receiving a request from a client device for a digital component generated by a first SDK installed at a client device, examining data fields of the request by servers, generating real-time requests by the servers, and transmitting each real-time request to a third-party digital component provider by the servers. The method further includes receiving responses to the real-time requests from the third party digital component provider by the servers, selecting a particular response to transmit to the client device responsive to the request for the digital component by the servers, and transmitting the particular response to the first SDK with instructions specifying which SDK installed at the client device is required to render a digital component included in the particular response by the servers.

20 Claims, 6 Drawing Sheets

(51) Int. Cl.
    *G06F 9/54*      (2006.01)
    *G06F 21/60*     (2013.01)

(56) References Cited

U.S. PATENT DOCUMENTS

| | | | | |
|---|---|---|---|---|
| 2015/0213516 A1* | 7/2015 | Jeremias | ............ | G06Q 30/0277 |
| | | | | 705/14.73 |
| 2015/0287103 A1* | 10/2015 | Gupta | ................ | G06Q 30/0277 |
| | | | | 705/14.73 |
| 2015/0310495 A1* | 10/2015 | Goldberg | ........... | G06Q 30/0267 |
| | | | | 705/14.43 |
| 2016/0086215 A1* | 3/2016 | Wang | ................. | G06Q 30/0246 |
| | | | | 705/14.45 |
| 2017/0221092 A1* | 8/2017 | Toval | ................ | G06Q 30/0244 |
| 2017/0337589 A1* | 11/2017 | Yu | .......................... | G06Q 30/02 |
| 2017/0345056 A1* | 11/2017 | Chen | .................. | G06Q 30/0201 |
| 2018/0047058 A1* | 2/2018 | Kang | ................. | G06F 3/04842 |
| 2018/0130098 A1* | 5/2018 | Swanson | ............ | G06Q 30/0269 |
| 2018/0278719 A1* | 9/2018 | Dawson | ................. | G06Q 30/00 |

OTHER PUBLICATIONS

'developers.google.com' [online] "Mediation," Last updated Oct. 6, 2017, [retrieved on Oct. 10, 2017] Retrieved from Internet: URL<https://developers.google.com/admob/android/mediation> 8 pages.

'developers.google.com' [online] "Real-Time Bidding Protocol Buffer v.134," Last updated Sep. 20, 2017, [retrieved on Oct. 10, 2017] Retrieved from Internet: URL<https://developers.google.com/ad-exchange/rtb/downloads/realtime-bidding-proto> 32 pages.

'developers.heyzap.com' [online] "Android SDK 9," Copyright 2017, [retrieved on Oct. 10, 2017] Retrieved from Internet: URL<https://developers.heyzap.com/docs/android_sdk_setup_and_requirements> 10 pages.

'www.iab.com' [online] "RTB Project: OpenRTB API Specification Version 2.4," Mar. 2016 [retrieved on Oct. 10, 2017] Retrieved from Internet: URL<https://www.iab.com/wp-content/uploads/2016/03/OpenRTB-API-Specification-Version-2-4-FINAL.pdf> 75 pages.

'www.mopub.com' [online] "Client-Side SDK Mediation," Last updated Mar. 2017, [retrieved on Oct. 10, 2017] Retrieved from Internet: URL<https://www.mopub.com/resources/docs/mopub-network-mediation/client-side-sdk-mediation/> 3 pages.

Adikari et al. "Real Time Bidding in Online Digital Advertisement," 10th International Conference New Horizons in Design Science: Broadening the Research Agenda, col. 9073,(558), May 20-22, 2015, 20 pages.

International Search Report and Written Opinion issued International Application No. PCT/US2017/016220, dated Oct. 4, 2017, 16 pages.

\* cited by examiner

CUSTOM DIGITAL COMPONENTS

CROSS-REFERENCE TO RELATED APPLICATION

This application is a National Stage Application under 35 U.S.C. § 371 and claims the benefit of International Application No. PCT/US2017/016220, filed Feb. 2, 2017. The disclosure of the foregoing application is hereby incorporated by reference in its entirety.

BACKGROUND

The present specification relates to processing digital components.

The internet facilitates the exchange of information between users across the globe. This exchange of information enables processing of requests for content such as digital components. In some situations, the content can be called by demand sources to render the content at a client device.

SUMMARY

In some implementations, methods of the present disclosure include processing requests for rendering digital components at client devices. For example, the methods can include receiving a request for a digital component from a software development kit (SDK) that is installed at a client device. The SDK can be a set of software development tools that enable the creation of applications for a particular platform of the client device. The SDK can include source code, development tools, an emulator, libraries, and the like, to build application for the particular platform. The request can be examined by one or more servers to identify an application that initiated the request at the client device. The servers can be configured to generate real-time requests based on the request for the digital component from the SDK. Each of the real-time requests can include information such as a set of other SDKs installed in the identified application. The real-time requests can be transmitted to third-party digital component providers within a particular amount of time following the receipt of the initial request from the client device. The real-time requests can be transmitted to the third-party digital component providers in series, in parallel, or any combination thereof. Further, the initial request can indicate an amount of time in which a digital component is required to be provided to the client device. In response to transmitting the real-time requests for a digital component to the third-party digital component providers, the servers can be configured to receive responses from the third-party digital component providers. The servers can also be configured to select a particular response to transmit to the client device in order to fulfil the initial request from the client device. In certain aspects, the particular response can include the digital component as well as instructions specifying a certain SDK installed at the client device to render the digital component.

One innovative aspect of the subject matter described in this specification is embodied in methods that include the actions of receiving, from a client device, a request for a digital component that was generated by a first software development kit (SDK) installed at the client device; examining, by one or more custom digital component servers, one or more data fields of the request, including: identifying, within the one or more data fields, application data specifying an application that initiated the request at the client device; generating, by the one or more servers, multiple real-time requests including: identifying, based on a mapping of application data to installed SDKs in a data structure, a set of SDKs that are installed in the application that initiated the request at the client device; including, in each real-time request, data specifying the set of SDKs that are installed in the application that initiated the request at the client device; transmitting, over a network by the one or more servers, each real-time request to a corresponding third-party digital component provider; and receiving, by the one or more servers, a set of responses to the multiple real-time requests from the corresponding third party digital component providers; selecting, by the one or more servers, a particular response from the set of responses to transmit to the client device responsive to the request for the digital component; and transmitting, by the one or more servers, the particular response to the first SDK with instructions specifying which SDK installed at the client device is required to render a digital component included in the particular response.

Other implementations of this and other aspects include corresponding systems, apparatus, and computer programs, configured to perform the actions of the methods, encoded on computer storage devices.

Implementations may each optionally include one or more of the following features. For instance, the methods can include identifying, within the one or more data fields, encrypted data that was generated by a second SDK installed at the client device, and wherein when generating the multiple real-time requests, the encrypted data is included in a particular one of the real-time requests sent to a particular one of the third-parties that is authorized to decrypt the encrypted data generated by the second SDK. In this instance, the methods can also include transmitting the particular real-time request to the particular third-party digital component provider without decrypting the encrypted data.

The methods can further include accessing the mapping of application data to installed SDKs, identifying, within the mapping, the application specified in the application data and a version of the application that initiated the request, and identifying the set of SDKs that are mapped to the application and the version of the application that initiated the request. In this instance, the methods can further include identifying, from a response log stored in a data structure, previous responses that were previously provided to the version of the application in response to previous requests that were initiated by the version of the application, identifying, from the previous responses, a set of multiple different SDKs that were specified in the previous responses, and mapping each SDK in the set of multiple different SDKs to the version of the application in the data structure.

In certain aspects, the methods can include transmitting instructions specifying an application programming interface (API) call to render the digital component included in the particular response. The methods can also include transmitting, over a network by the one or more servers, each real-time request to a corresponding third party digital component provider comprises transmitting the particular real-time request to the particular third-party digital component provider without decrypting the encrypted data. In some aspects, the methods can include providing control of the presentation of the custom digital component to the particular SDK.

The methods can further include transmitting each real-time request to a corresponding third-party digital component provider comprises not transmitting the particular real-time request to third-parties that are not authorized to decrypt the encrypted data generated by the second SDK, receiving the set of responses to the multiple real-time requests from the corresponding third party digital component providers comprises receiving a given response in the set specifies a particular SDK, other than the first SDK, that is required to render a particular digital component included in the given response, and transmitting the given response as the particular response, wherein the particular SDK is required to render the particular digital component included in the given response.

Advantageous implementations can include one or more of the following features. The methods allow for digital component requests to be sent in parallel to the different networks, thereby reducing the latency experienced with the client side mediation, whilst ensuring that multiple SDKs are supported, in contrast to the use of one SDK in methods of real-time bidding. In other words, when an application at a client device issues a request for a digital component, it may be desirable to receive responses to the request from third party digital component providers associated with a plurality of different SDKs. Thus, the methods can be used to process requests for digital components by leveraging benefits of real-time bidding while preserving properties of client-side mediation. Further, the SDKs can be used to collect customized signals at client devices and render custom digital components while transacting via real-time bidding with parallel calls for digital components such as custom digital components. Specifically, when an application issues a request for media content, it is desirable to receive offers for supply of digital components from third parties associated with the different SDKs.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, and devices that are used to process a request for a digital component and select a particular response to fulfill the request over a network. As discussed in more detail below, a first SDK can generate a request for a digital component. The request can be received by a server and examined to identify an application that corresponds to the request as well as a list of SDKs that can support digital component rendering at the application. The request and the information extracted from the request can be used to generate real-time requests by the server. The real-time requests can be transmitted to a plurality of third-party digital component providers. The server can receive responses to the real-time requests from the third-party digital component providers. The responses can include digital components such as custom digital components that require custom rendering by specific SDKs. The responses can be received by the server and then the server may be configured to select a particular response of the responses to fulfill the initial request. In this instance, the selected response may be transmitted from the server to a client device for rendering a particular digital component associated with the selected response by a specified SDK.

As used throughout this document, the phrase "digital component" refers to a discrete unit of digital content or digital information (e.g., a video clip, audio clip, multimedia clip, image, text, or another unit of content). A digital component can be stored electronically in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other component provider). Digital components can be integrated into (e.g., presented in) an electronic document that is provided by an electronic document provider that differs from the digital component provider.

Figure 1:
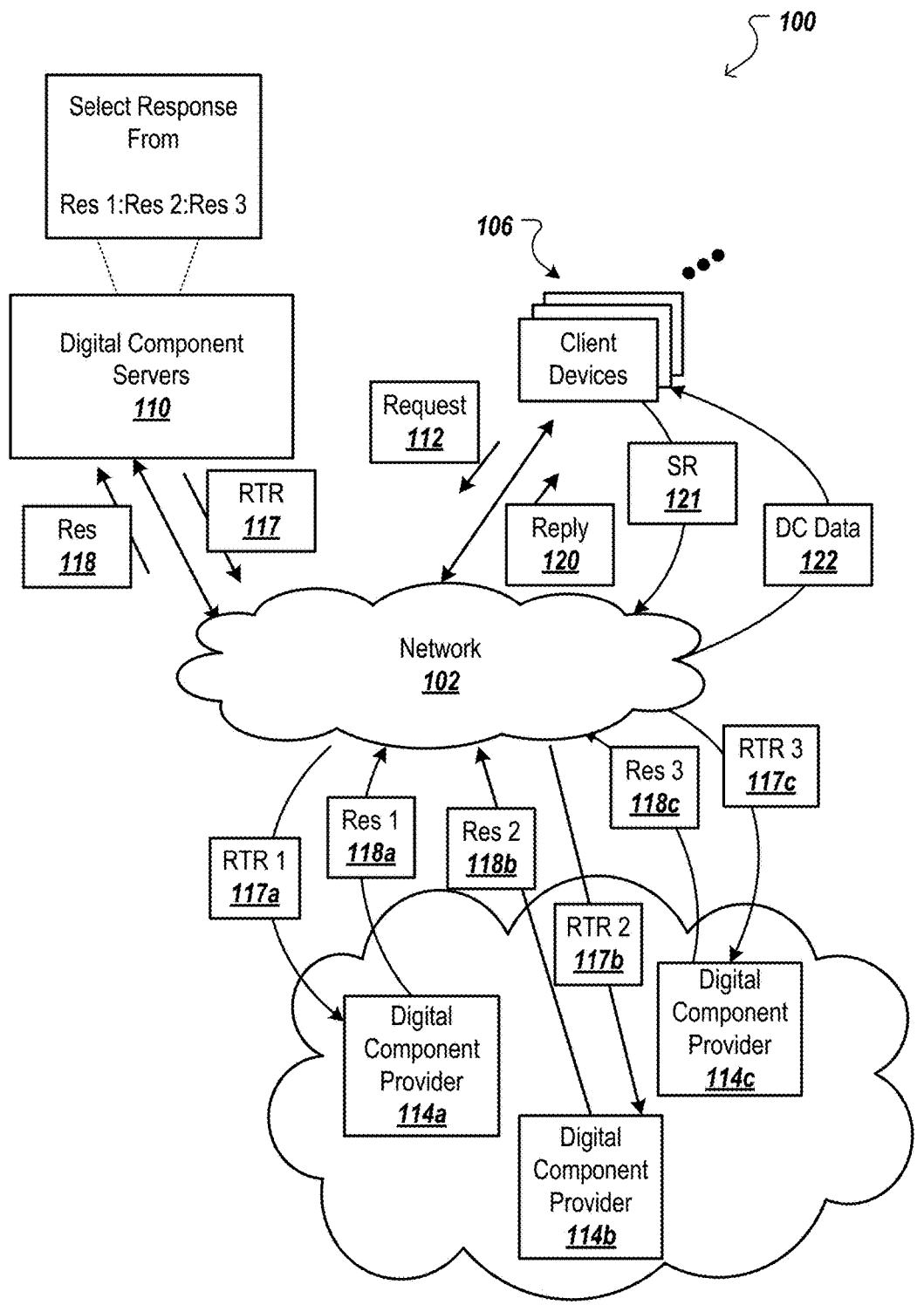
FIG. 1 is a block diagram of an example environment in which requests for custom digital components are processed.

FIG. 1 is a block diagram of an example environment 100 in which requests for custom digital components are processed. The example environment 100 includes a network 102, such as a local area network (LAN), a wide area network (WAN), the Internet, or any combination thereof. The network 102 connects client devices 106, digital component servers 110, and digital component providers 114. The example environment 100 may include many different client devices 106, digital component servers 110, and digital component providers 114.

A client device 106 is an electronic device that is capable of requesting and receiving resources, such as digital components, over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

The client devices 106 can include a plurality of SDKs installed at each of the client devices 106. The SDKs can each correspond to a set of software development tools that enable the creation of applications for a particular platform of the client devices 106. The SDKs can include source code, development tools, an emulator, libraries, and the like, to build application for the particular platform. The SDKs can be used to generate a request for a digital component 112, which is transmitted over the network 102 to the digital component servers 110. For example, a client device 106 can use a first SDK installed at the client device 106 to generate a request 112 for a custom digital component.

The request 112 can include data specifying features such as a name (or network location) of a digital component provider 114, a name (or network location) of the requesting device (e.g., the client device 106), and/or information that the digital component servers 110 can use to select a digital component to be provided in response to the request 112.

The request 112 is transmitted, by the client device 106, over the network 102, (e.g., a telecommunications network) to one or more of the digital component servers 110. The request 112 can also include data specifying other features, such as application data indicating an application that initiated the request 112 as well as a set of SDKs that are installed at the client device 106.

The digital component servers 110, which includes one or more digital component servers, generates multiple real-time requests 117 for digital components in response to examining the request 112 and/or using information included in the request 112. For example, the digital component servers 110 can examine one or more data fields of the request 112. The data fields can be examined to identify application data specifying a particular application that initiated the request 112 at the client device 106. Further, the digital component servers 110 can be configured to generate the multiple real-time requests 117 using information extracted from the data fields.

In some examples, the digital component servers 110 can be configured to identify a set of SDKs that are installed in the particular application that initiated the request 112 at the client device 106. Specifically, the digital component servers 110 can identify the set of SDKs based on a mapping of the application data to installed SDKs in a data structure. For example, the digital component servers 110 can be configured to identify a set of installed SDKs based on a data structure that organizes application data to particular SDKs. Specifically, the data structure can store a mapping of application data to installed SDKs that are installed in various applications at the client device 106. Thus, as the digital component servers 110 identify application data based on the request 112, the digital component servers 110 can use a data structure such as a lookup table to map the application data to certain SDKs.

As the application data is mapped to certain SDKs, the digital component servers 110 can identify which SDKs are installed in one or more applications at the client device 106. The digital component servers 110 can also be configured to include data specifying the identified set of installed SDKs in the real-time requests 117. In some aspects, the data structure can be a predetermined data structure that is defined prior to the initial request 112 and accessed by the digital component servers 110. In other aspects, the digital component servers 110 can be configured to generate the data structure using the mapping of application data to specified SDKs and applications.

As shown in FIG. 1, the digital component servers 110 can further be configured to transmit the real-time requests 117 to digital component providers 114 via the network 102. For example, the digital component servers 110 may generate three real-time requests 117a-c and transmit each of the real-time requests 117a-c, in parallel, to a particular digital component provider 114a-c. In this instance, a first real-time request 117a may be transmitted to a first digital component provider 114a, a second real-time request 117b may be transmitted to a second digital component provider 114b, and a third real-time request 117c may be provided to a digital component provider 114c. In certain aspects, a single real-time request 117 is transmitted to multiple, different digital component providers 114. For example, the first real-time request 117a may be transmitted in parallel to the first digital component provider 114a, the second digital component provider 114b, and the third digital component provider 114c. In this instance, a single real-time request 117 such as the first real-time request 117a may be transmitted to multiple digital component providers 114 to receive bids from each of the digital component providers 114 for rendering digital components. The initial request 117 may require a response to be provided within a predetermined period of time. Each of the digital component providers 114 may provide a response 118 to the request 117 that includes a bid for a particular digital component. Thus, the single request 117 may be provided to multiple digital component providers 114 in an effort to receive a digital component quickly, that is associated with the highest bidder within the predetermined period of time for the response 118. In certain aspects, the response 118 to the request 117 may optionally or additionally include digital components to be rendered, such as a digital component markup or a link to a digital component markup.

The digital component providers 114 can include one or more digital component providers such as third-party digital component providers. The digital component providers 114a-c can be configured to generate responses 118a-c to the real-time requests 117. The responses 118 can include a digital component for rendering at the client device 106. In some aspects, the responses 118 can include one or more potential digital components for rendering at the client device 106. The digital components of the responses 118 can also include custom digital components. The custom digital components (e.g., custom advertisements) can include custom creative formats that may be rendered by particular SDKs installed at the client device 106. As such, a custom digital component included in a response 118 may indicate that the custom digital component is required to be rendered by a SDK other than the first SDK that generated the original request 112.

The responses 118 can be received by the digital component servers 110 over the network 102. The digital component servers 110 can be configured to select a particular response to fulfill the request 112 for the digital component. For example, the digital component servers 110 may receive three responses 118a-c that are responsive to the real-time requests 117a-c. A particular response of the three responses 118a-c can be selected by the digital component servers 110 to transmit to the client device 106 in response to the initial request 112 for the digital component. In some aspects, the particular response may be selected by the digital component servers 110 based on bids associated with each of the responses 118a-c. In other aspects, the particular response may be selected based on specified digital component features of the request 112.

The selected response can be transmitted from the digital component servers 110 to the client device 106 over the network 102. The selected response can be transmitted as a reply 120 to the initial request 112 for a digital component. In certain aspects, the reply 120 can be transmitted to the first SDK that generated the request 112. The reply 120 can include instructions specifying an SDK installed at the client device 106, other than the first SDK, that is required to render the digital component included in the reply 120.

In some aspects, the client device 106 executes instructions included in the reply 120. For example, the instructions can be used by the client device 106 to configure and enable the rendering of a particular digital component included in the reply 120. In another example, the instructions can be used to configure and enable the client device 106 to obtain the particular digital component from a corresponding digital component provider 114. For example, the instructions in the reply 120 can include a network location (e.g., a Uniform Resource Locator (URL)) and a script that causes the client device 106 to transmit a server request (SR) 121 to the corresponding digital component provider 114 to obtain the particular digital component from the digital component provider 114. In response to the request 121, the digital component provider 114 can identify the particular digital component specified in the server request 121 and transmit, to the client device 106, digital component data (DC Data) 122 that transmits the particular digital component for rendering to the client device 106.

Figure 2:
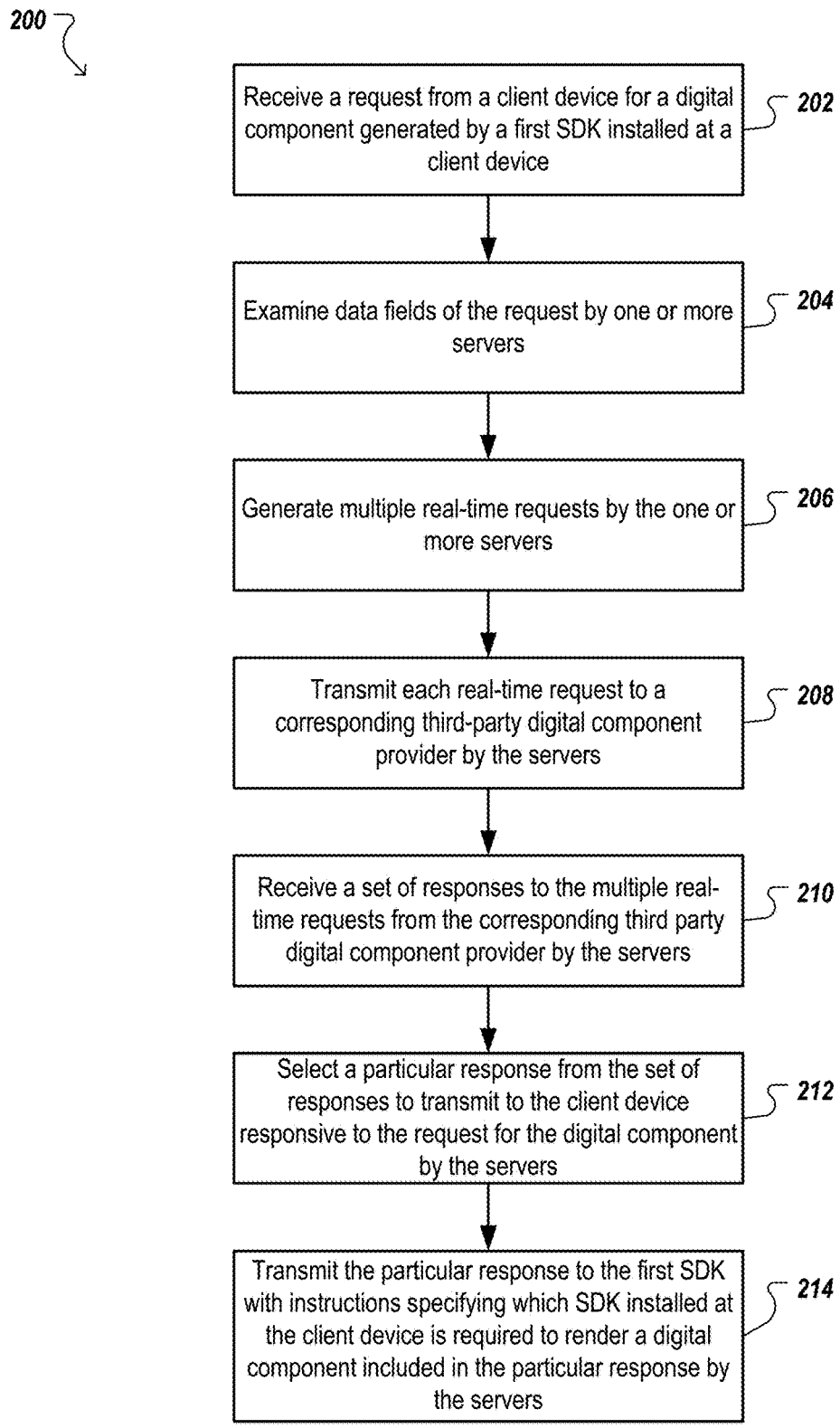
FIG. 2 is a flow chart of an example process for processing custom digital components.

FIG. 2 is a flow chart of an example process 200 for processing custom digital components. The process 200 can be performed by one or more servers or other computing devices. For example, operations of the process 200 can be performed by digital component servers 110 of FIG. 1. Operations of the process 200 can also be implemented as instructions stored on a non-transitory computer readable medium, and when the instructions are executed by one or more servers (or other computing devices), the instructions cause the one or more servers to perform operations of the process 200.

At step 202, digital component servers receive a request for a digital component that was generated by a first SDK installed at a client device. The request for a digital component can include data specifying features such as a name (or network location) of a digital component provider, a name (or network location) of the requesting device (e.g., the client device), and/or information that the digital component servers can use to select a digital component to be provided in response to the request. The request is received, over a network, (e.g., a telecommunications network) by one or more of the digital component servers. The request can also include data specifying other features, such as application data specifying an application that initiated the request as well as a set of SDKs that are installed at the client device.

At step 204, the digital component servers examine data fields of the request. The digital component servers can examine one or more data fields of the request. The data fields can each include different types of data such as integers, strings, dates, and the like. In some aspects, the digital component servers are configured to examine the data fields of the request to identify encrypted data of the request. The encrypted data can be identified as generated by a second SDK installed at the client device. The encrypted data can include proprietary signals (e.g., proprietary to a provider of the second SDK) that correspond to previously rendered digital components (e.g., previously rendered by the second SDK, or within an application that includes the second SDK). The previously rendered digital components can be rendered by particular SDKs installed at the client device. The information representing the SDKs can include a plurality of different SDKs as well as a plurality of different versions of applications that correspond to the different SDKs. Further, the encrypted data can include data specific to the client device. For example, the encrypted data can include accelerometer data representing orientation of the client device, accelerometer data representing movement of the client device, location signals representing a geographic location of the client device, and the like.

At step 206, the digital component servers generate multiple real-time requests based on the examining of the data fields of the request. The real-time requests can include requests for one or more digital components. The digital component servers can be configured to include data specifying the identified set of installed SDKs in the real-time requests. The servers can be configured to generate real-time requests based on the request for the digital component from the SDK. Each of the real-time requests can include information such as a set of other SDKs installed in the identified application.

In some aspects, the encrypted data is included in the real-time requests. The encrypted data can be included in one or more of the real-time requests in preparation for transmission to digital component providers. The encrypted data can be included in a certain real-time request in preparation for transmission to a certain digital component provider. The certain digital component provider can be a digital component provider that is authorized to decrypt the encrypted data. The encrypted data can be included in the real-time requests, but remain confidential from the digital component servers, to only be decrypted by authorized digital component providers. For example, the encrypted data can be included in all real-time requests and only decrypted by authorized digital component providers using keys.

At step 208, the digital component servers transmit each real-time request to a corresponding digital component provider. For example, the digital component providers can be third-party component providers. The digital component servers can be configured to transmit the real-time requests to digital component providers over the network. For example, the digital component servers may generate three real-time requests and transmit each of the real-time requests to one of three particular digital component providers. The real-time requests can be transmitted to the digital component providers within a particular amount of time following the receipt of the initial request from the client device. The real-time requests can be transmitted to the third-party digital component providers in series, in parallel, or any combination thereof. Further, the initial request can indicate an amount of time in which a digital component is required to be provided to the client device by the digital component servers.

The real-time requests can include the encrypted data. For example, a real-time request including encrypted data can be generated by the digital component servers and transmitted to an authorized digital component server without decrypting the encrypted data. Thus, the digital component servers can be configured to prepare the real-time requests and direct the real-time requests to digital component providers without compromising the confidentiality of the encrypted data included in the real-time requests. Further, the digital component servers can be configured to transmit the real-time requests that include encrypted data to only authorized digital component providers.

At step 210, the digital component servers receive a set of responses to the multiple real-time requests from the corresponding third-party digital component providers. For example, each third-party digital component provider can provide a response to the digital component servers. The responses can each include a digital component for rendering at the client device. In some aspects, the responses can include one or more potential digital components for rendering at the client device. The digital components of the responses can include custom digital components. The custom digital components can include custom creative formats that may be rendered by particular SDKs at the client device. As such, a custom digital component included in a response may indicate that the custom digital component is required to be rendered by a SDK other than the first SDK that generated the original request.

At step 212, the digital component servers select a particular response from the set of responses to transmit to the client device responsive to the request for the digital component. For example, the digital component servers may receive three responses that are responsive to the real-time requests. A particular response of the three responses can be selected by the digital component servers to transmit to the client device. In some aspects, the particular response may be selected by the digital component servers based on selection scores (e.g., bids or some other value that can be used to rank and/or select a digital component from among multiple different available digital components) associated with each of the responses. In this instance, the particular response may correspond to the highest selection score out of all the received selection scores. In certain aspects, the particular response may be selected based on specified digital component features of the request. In this instance, the particular response may include a digital component that meets all of the criteria of the initial request from the client device.

At step 214, the digital component servers transmit the particular response to the first SDK with instructions specifying which SDK installed at the client device is required to render a digital component included in the particular response. The selected response can be transmitted from the digital component servers to the client device over the network. The selected response can be transmitted as a reply to the initial request for a digital component. In certain aspects, the particular response can be transmitted to the first SDK that generated the request. The particular response can include instructions specifying that an SDK other than the first SDK, is required to render a digital component included in the particular response. In this instance, the SDK other than the first SDK can be a certain SDK, or a SDK that is merely different from the first SDK that generated the original request.

In certain aspects, the instructions can specify an application programming interface (API) call to render the digital component included in the particular response. The API call can be implemented by the specified SDK at the client device. The API call can include a set of specific operations that an application invokes to perform tasks. As such, the API call can include a set of operations to render a digital component via the particular SDK of an application at the client device.

In some aspects, the instructions can provide control of the presentation of the digital component to the particular SDK. In other words, the particular SDK can be configured to execute the rendering of the digital component at the client device (e.g., using rendering capabilities that the particular SDK has, but that other SDKs installed at the client device may not have).

Figure 3:
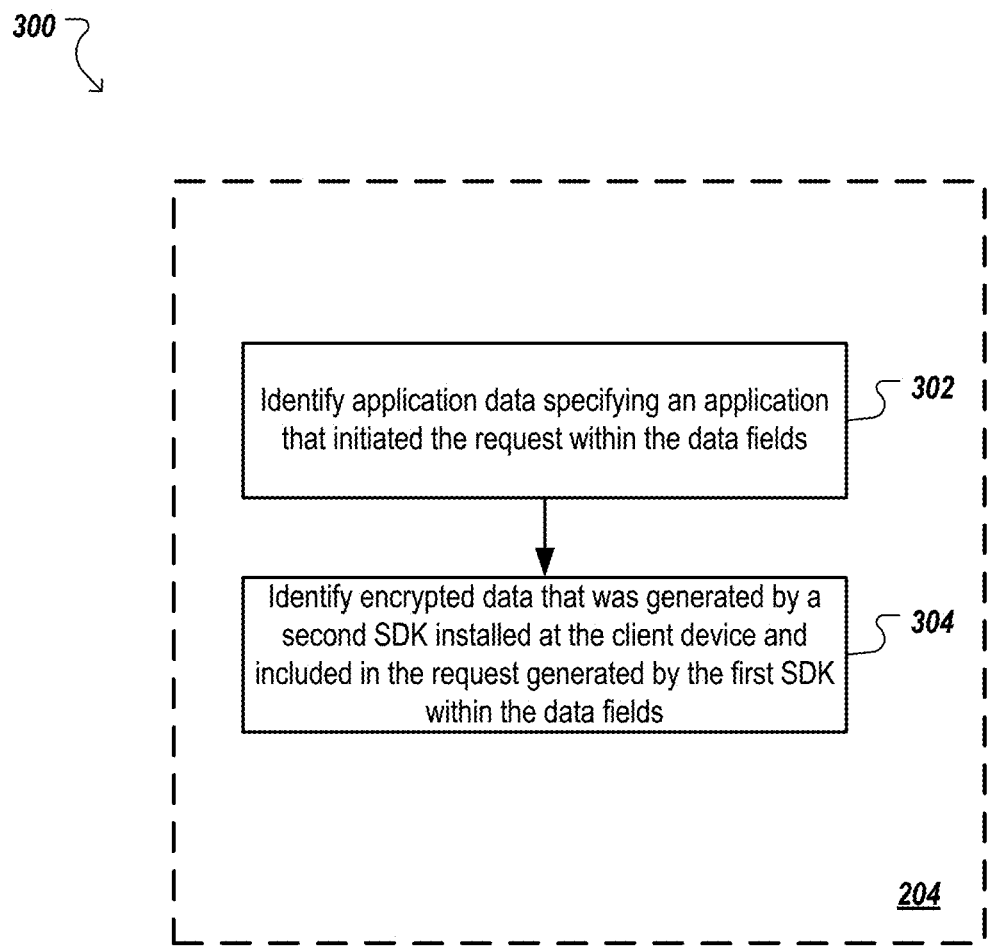
FIG. 3 is a flow chart of an example process for examining data fields of a request.

FIG. 3 is a flow chart of an example process for examining data fields of a request for a digital component. The process 300 can include a subprocess for step 204 of the process 200. The process 300 can be performed by one or more servers or other computing devices. For example, operations of the process 300 can be performed by digital component servers 110 of FIG. 1. Operations of the process 300 can also be implemented as instructions stored on a non-transitory computer readable medium, and when the instructions are executed by one or more servers (or other computing devices), the instructions cause the one or more servers to perform operations of the process 300.

At step 302, the digital component servers identify application data specifying an application that initiated the request within the data fields. Specifically, the data fields can be examined to identify application data specifying a particular application that initiated the request at the client device. The data fields can correspond to a particular application based on the contents of the data fields as well as the types of data fields included in the request.

At step 304, the digital component servers are configured to examine the data fields of the request to identify encrypted data of the request. The encrypted data can be identified as generated by a second SDK installed at the client device. The encrypted data can include proprietary signals that correspond to previously rendered digital components. The previously rendered digital components can be rendered by particular SDKs installed at the client device. As such, information representing the SDKs that have been previously used to render digital components can also be included in the encrypted data. The information representing the SDKs can include a plurality of different SDKs as well as a plurality of different versions of applications that correspond to the different SDKs. Further, the encrypted data can include data specific to the client device. For example, the encrypted data can include accelerometer data representing orientation of the client device, accelerometer data representing movement of the client device, location signals representing a geographic location of the client device, and the like.

Figure 4:
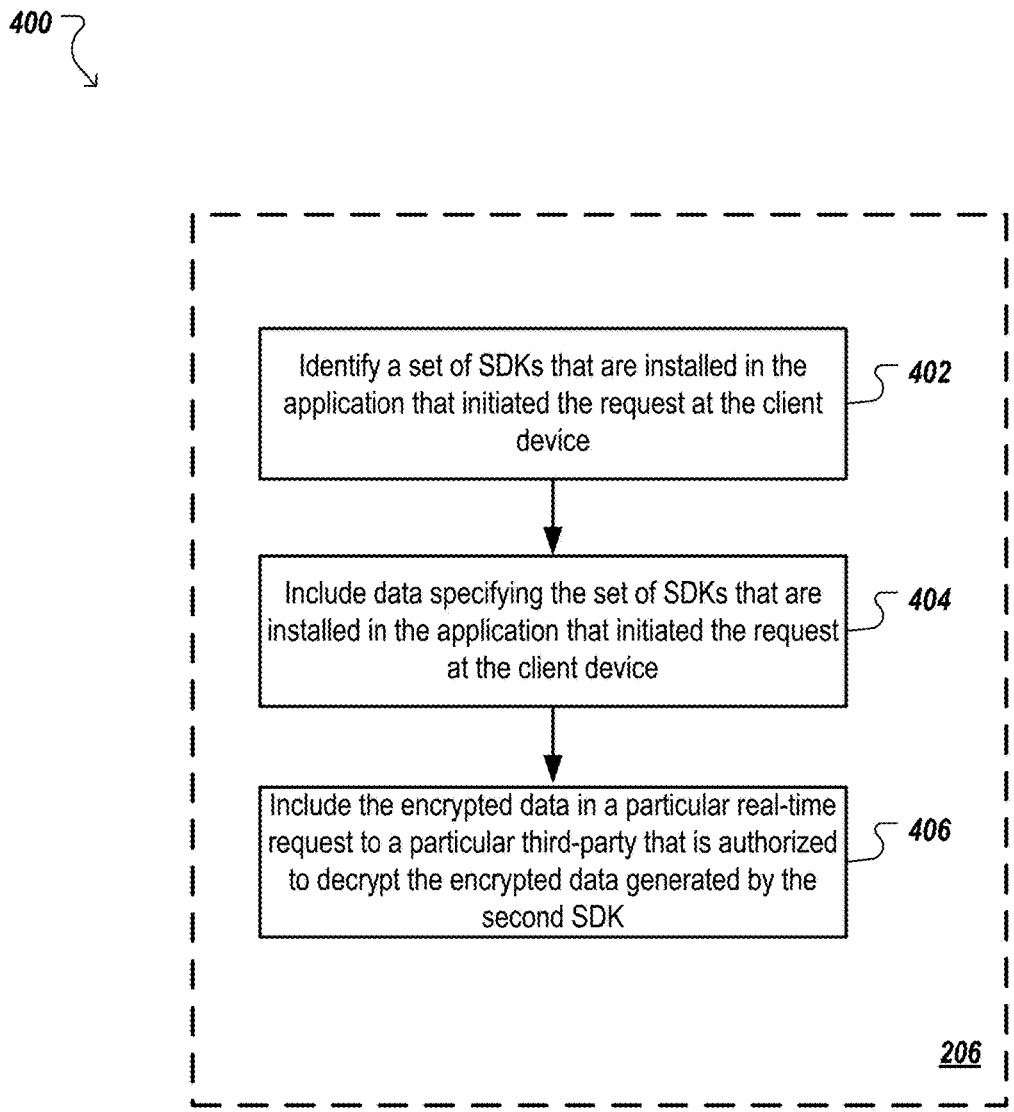
FIG. 4 is a flow chart of an example process for generating real-time requests.

FIG. 4 is a flow chart of an example process for generating real-time requests. The process 400 can include a subprocess for step 206 of the process 200. The process 400 can be performed by one or more servers or other computing devices. For example, operations of the process 400 can be performed by digital component servers 110 of FIG. 1. Operations of the process 400 can also be implemented as instructions stored on a non-transitory computer readable medium, and when the instructions are executed by one or more servers (or other computing devices), the instructions cause the one or more servers to perform operations of the process 400.

At step 402, the digital component servers identify a set of SDKs that are installed in the particular application that initiated the request at the client device. Specifically, the digital component servers can identify the set of SDKs based on a mapping of the application data to installed SDKs in a data structure. In some aspects, the digital component servers can be configured to access a mapping of application data to installed SDKs. The digital component servers can further be configured to identify, within the mapping of application data, the application specified in the application data and a version of the application that initiated the request. In this instance, the digital component servers may identify the set of SDKs that are mapped to the application and the version of the application that initiated the initial request for a digital component.

For example, the digital component servers can be configured to identify a set of installed SDKs based on a predetermined data structure that classifies application data to particular SDKs. Thus, as the digital component servers identify application data based on the request, the digital component servers can use a data structure such as a lookup table to map the application data to certain SDKs. As the application data is mapped to certain SDKs, the digital component servers can identify which SDKs are installed in the application at the client device. The digital component servers can be configured to include data specifying the identified set of installed SDKs in the real-time requests.

In some aspects, the digital component servers can be configured to generate the mapping of application data to installed SDKs. In this instance, the digital component servers may identify previous responses that were previously provided to a particular version of the application in response to previous requests that were initiated by the particular version of the application. The previous responses may be identified from a response log stored in a data structure. The digital component servers can be configured to identify a set of multiple different SDKs that were specified in the previous responses. Further, the digital component servers can be configured to map each SDK in the set of multiple SDKs to the particular version of the application in the data structure.

At step 404, the digital component servers include data specifying the set of SDKs that are installed in the application that initiated the request at the client device in each real-time request. The real-time requests may be independent from one another. In this instance, each real-time request may correspond to a particular digital component provider. The real-time requests may be sent to particular digital component providers based on the set of SDKs that are installed in the application that initiated the request at the client device.

At step 406, the digital component servers include the encrypted data in a particular real-time request to a particular digital component provider that is authorized to decrypt the encrypted data generated by the second SDK. The encrypted data may be included in one or more real-time requests. The encrypted data can be the same for each of the authorized digital component providers. In other aspects, the encrypted data can be exclusive to each of the digital component providers so that the data is only able to be decrypted by a corresponding, particular digital component provider.

Figure 5:
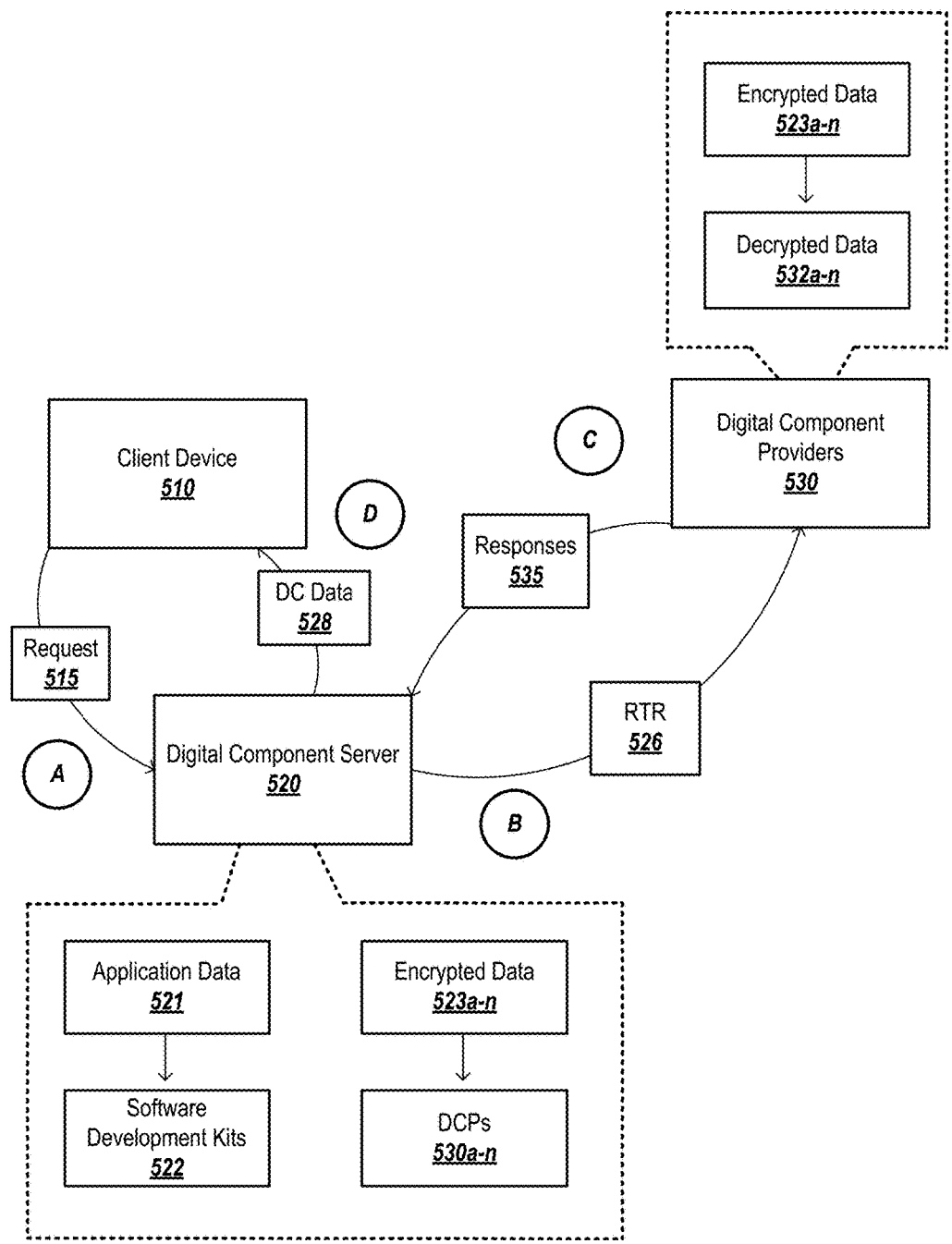
FIG. 5 is a block diagram illustrating example communications with digital component providers.

FIG. 5 is a block diagram illustrating example communications with digital component providers. As shown at event (A) in FIG. 5, a client device 510 can submit a request 515 for a digital component to a digital component server 520. The request 515 can be a request for a custom digital component. The request 515 can be initiated by a particular application of the client device 510 and generated by a first SDK installed at the client device 510. The first SDK can be one of multiple SDKs installed at the client device 510 and the application can be one of multiple applications installed at the client device 510.

At event (B), the digital component server 520 receives the request 515 and in response to receiving the request 515, generates multiple real-time requests 526. The digital component server 520 can examine data fields of the request 515 to determine contents of the request 515 as well as information about the client device 510. The digital component server 520 can be configured to identify application data 521 by examining the request 515. The application data 521 can be used by the digital component server 520 to identify a particular application that initiated the request 515. The application data 521 can further be used by the digital component server 520 to identify a set of installed SDKs 522 at the client device 510.

The digital component server 520 may generate the multiple real-time requests 526 in lieu of the request 515 generated by the client device 510. In this instance, the digital component server 520 can be configured to generate the multiple real-time requests 526 on behalf of the client device 510.

In certain aspects, the digital component server 520 can examine the request 515 to identify encrypted data that was generated by a second SDK installed at the client device 510. The encrypted data can correspond to previous requests 515, previously rendered digital components, SDKs used to render digital components, data collected at the time the request 515 is generated, data collected at the time the real-time requests 526 are generated, and the like.

The digital component server 520 can be configured to generate one or more real-time requests 526 to provide to digital component providers 530. In some aspects, the real-time requests 526 are designated for particular digital component providers 530a-n. In this instance, the real-time requests 526 may include encrypted data 523a-n that is authorized to be decrypted by certain digital component providers 530a-n. As such, the digital component server 520 may generate a plurality of real-time requests 526 that each include encrypted data 523a-n corresponding to select digital component providers 530a-n.

The digital component server 520 can include one or more servers that receive and process requests for digital components. For example, the digital component server 520 can include a front end server that receives requests for digital components and another server that is configured to process the request for digital components. In this instance, the front end server and the another server can be implemented as separate devices that communicate over a network. As would be recognized by one of ordinary skill in the art, the front end server and the another server can be integrated as a single hardware device, such as a single digital component server 520.

At event (C), the digital component providers 530 receive the real-time requests 526 and provide responses 535 to the real-time requests 526. The digital component providers 530 can be configured to provide digital components as responses 535 to the real-time requests 526. For example, each digital component provider 530a-n may receive a real-time request 526, and provide a response 535 including a digital component for rendering at the client device 510 to the digital component server 520.

In some aspects, the digital component providers 530 receive encrypted data 523a-n included in the real-time requests 526. The encrypted data 523a-n can be decrypted by authorized digital component providers. In this instance, the digital component providers 530 may use decrypted data 532a-n to determine whether to provide responses 535 to the real-time requests 526, bid prices to associate with the responses 535, which digital components to return in the responses 535, and the like. As such, the authorized digital component providers can be configured to generate responses 535 to the real-time requests 526 using the decrypted data 523a-n that each authorized digital component provider decrypted, and provide the responses 535 to the digital component server 520.

At event (D), the digital component server 520 receives the responses 535 from the digital component providers 530 and selects a particular response to transmit to the client device 510. The digital component server 520 can select the particular response for rendering by an SDK that is installed at the client device 510. In some aspects, the particular response may be selected by the digital component server 520 based on bids associated with each of the responses 535. In other aspects, the particular response may be selected based on specified digital component features of the initial request 515.

The selected response can be transmitted from the digital component server 520 to the client device 510 as digital component data 528. The digital component data 528 can be provided as a reply to the initial request 515 for a digital component. In certain aspects, the digital component data 528 can be transmitted to the first SDK that generated the request 515 at the client device 510. The digital component data 528 can include instructions specifying another SDK installed at the client device 510, other than the first SDK, that is required to render a digital component corresponding to the digital component data 528.

Figure 6:
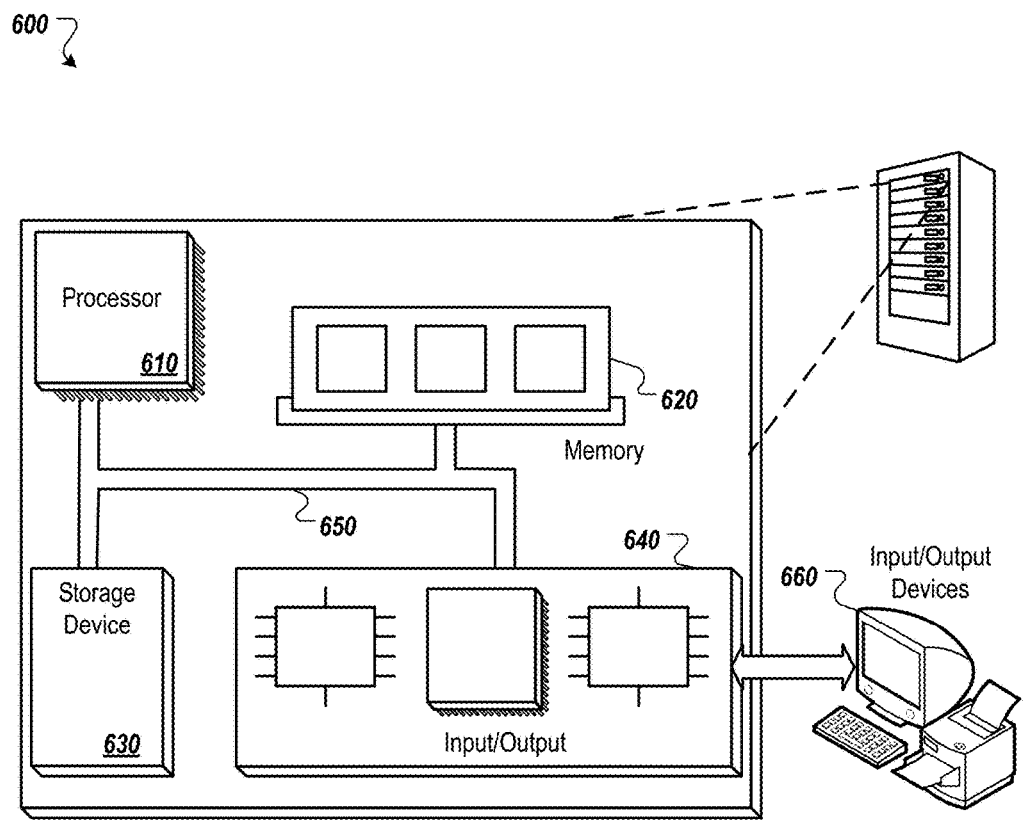
FIG. 6 is a block diagram of an example computing system.

FIG. 6 is a block diagram of an example computing system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document may, but need not, correspond to a file. A document may be stored in a portion of a file that holds other documents, in a single file dedicated to the document in question, or in multiple coordinated files.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A system, comprising:
a data structure storing a mapping of application data to installed software development kits (SDKs) that are installed in various applications;
a front-end server that receives, from a client device, a request for a digital component that was generated by a first SDK installed at the client device; and
a custom digital component server that processes the request by performing operations including:
receiving, from the client device, the request for the digital component that was generated by the first SDK installed at the client device;
examining one or more data fields of the request, including:
identifying, within the one or more data fields, application data specifying an application that initiated the request at the client device; and
identifying, within the one or more data fields, encrypted data that was generated and encrypted by a second SDK installed at the client device and included in the request generated by the first SDK;
generating multiple real-time requests including:
identifying, based on the mapping of application data to installed SDKs in the data structure, a set of SDKs that are installed in the application that initiated the request at the client device;
including, in each real-time request, data specifying the set of SDKs that are installed in the application that initiated the request at the client device; and
including the encrypted data in a particular real-time request to a particular third-party that is authorized to decrypt the encrypted data generated by the second SDK;
transmitting, over a network, each real-time request to a corresponding third-party digital component provider; and
receiving a set of responses to the multiple real-time requests from the corresponding third party digital component providers;
selecting a particular response from the set of responses to transmit to the client device responsive to the request for the digital component; and
transmitting the particular response to the first SDK with instructions specifying which SDK installed at the client device is required to render a digital component included in the particular response.

2. The system of claim 1, wherein identifying the set of SDKs that are installed in the application that initiated the request comprises:
accessing the mapping of application data to installed SDKs;
identifying, within the mapping, the application specified in the application data and a version of the application that initiated the request;
identifying the set of SDKs that are mapped to the application and the version of the application that initiated the request.

3. The system of claim 2, wherein the operations further comprise generating the mapping of application data to installed SDKs, including:

identifying, from a response log stored in the data structure, previous responses that were previously provided to the version of the application in response to previous requests that were initiated by the version of the application;

identifying, from the previous responses, a set of multiple different SDKs that were specified in the previous responses; and mapping each SDK in the set of multiple different SDKs to the version of the application in the data structure.

4. The system of claim 1, wherein transmitting the particular response to the first SDK with instructions specifying which SDK installed at the client device is required to render the digital component included in the particular response comprises transmitting instructions specifying an application program interface (API) call to render the digital component included in the particular response.

5. The system of claim 1, wherein transmitting, over a network, each real-time request to a corresponding third party digital component provider comprises transmitting the particular real-time request to the particular third-party digital component provider without decrypting the encrypted data.

6. The system of claim 1, wherein the operations further includes: providing a particular custom digital component associated with the particular response for presentation by a particular SDK in an electronic document at the client device.

7. The system of claim 1, wherein:
transmitting each real-time request to a corresponding third-party digital component provider comprises not transmitting the particular real-time request to third-parties that are not authorized to decrypt the encrypted data generated by the second SDK;
receiving the set of responses to the multiple real-time requests from the corresponding third party digital component providers comprises receiving a given response in the set specifies a particular SDK, other than the first SDK, that is required to render a particular digital component included in the given response; and
transmitting the given response as the particular response, wherein the particular SDK is required to render the particular digital component included in the given response.

8. A method, comprising:
receiving, from a client device, a request for a digital component that was generated by a first software development kit (SDK) installed at the client device;
examining, by one or more custom digital component servers, one or more data fields of the request, including:
identifying, within the one or more data fields, application data specifying an application that initiated the request at the client device; and
identifying, within the one or more data fields, encrypted data that was generated and encrypted by a second SDK installed at the client device and included in the request generated by the first SDK;
generating, by the one or more custom digital component servers, multiple real-time requests including:
identifying, based on a mapping of application data to installed SDKs in a data structure, a set of SDKs that are installed in the application that initiated the request at the client device;
including, in each real-time request, data specifying the set of SDKs that are installed in the application that initiated the request at the client device; and including the encrypted data in a particular real-time request to a particular third-party that is authorized to decrypt the encrypted data generated by the second SDK;

transmitting, over a network by the one or more custom digital component servers, each real-time request to a corresponding third-party digital component provider; and receiving, by the one or more custom digital component servers, a set of responses to the multiple real-time requests from the corresponding third party digital component providers;

selecting, by the one or more custom digital component servers, a particular response from the set of responses to transmit to the client device responsive to the request for the digital component; and transmitting, by the one or more custom digital component servers, the particular response to the first SDK with instructions specifying which SDK installed at the client device is required to render a digital component included in the particular response.

9. The method of claim 8, wherein identifying a set of SDKs that are installed in the application that initiated the request comprises:
accessing the mapping of application data to installed SDKs;
identifying, within the mapping, the application specified in the application data and a version of the application that initiated the request;
identifying the set of SDKs that are mapped to the application and the version of the application that initiated the request.

10. The method of claim 9, further comprising generating the mapping of application data to installed SDKs, including:
identifying, from a response log stored in a data structure, previous responses that were previously provided to the version of the application in response to previous requests that were initiated by the version of the application;
identifying, from the previous responses, a set of multiple different SDKs that were specified in the previous responses; and
mapping each SDK in the set of multiple different SDKs to the version of the application in the data structure.

11. The method of claim 8, wherein transmitting the particular response to the first SDK with instructions specifying which SDK installed at the client device is required to render a digital component included in the particular response comprises transmitting instructions specifying an application program interface (API) call to render the digital component included in the particular response.

12. The method of claim 8, wherein transmitting, over a network by the one or more custom digital component servers, each real-time request to a corresponding third party digital component provider comprises transmitting the particular real-time request to the particular third-party digital component provider without decrypting the encrypted data.

13. The method of claim 8, further comprising: providing a particular custom digital component associated with the particular response for presentation by a particular SDK in an electronic document at the client device.

14. The method of claim 8, wherein:
transmitting each real-time request to a corresponding third-party digital component provider comprises not transmitting the particular real-time request to third-parties that are not authorized to decrypt the encrypted data generated by the second SDK;

receiving the set of responses to the multiple real-time requests from the corresponding third party digital component providers comprises receiving a given response in the set specifies a particular SDK, other than the first SDK, that is required to render a particular digital component included in the given response; and transmitting the given response as the particular response, wherein the particular SDK is required to render the particular digital component included in the given response.

15. A non-transitory computer storage medium encoded with a computer program, the program comprising instructions that when executed by data processing apparatus cause the data processing apparatus to perform operations comprising:

receiving, from a client device, a request for a digital component that was generated by a first software development kit (SDK) installed at the client device;

examining one or more data fields of the request, including:

identifying, within the one or more data fields, application data specifying an application that initiated the request at the client device; and identifying, within the one or more data fields, encrypted data that was generated and encrypted by a second SDK installed at the client device and included in the request generated by the first SDK;

generating multiple real-time requests including:

identifying, based on a mapping of application data to installed SDKs in a data structure, a set of SDKs that are installed in the application that initiated the request at the client device;

including, in each real-time request, data specifying the set of SDKs that are installed in the application that initiated the request at the client device; and including the encrypted data in a particular real-time request to a particular third-party that is authorized to decrypt the encrypted data generated by the second SDK;

transmitting, over a network, each real-time request to a corresponding third-party digital component provider; and receiving a set of responses to the multiple real-time requests from the corresponding third party digital component providers;

selecting a particular response from the set of responses to transmit to the client device responsive to the request for the digital component; and transmitting the particular response to the first SDK with instructions specifying which SDK installed at the client device is required to render a digital component included in the particular response.

16. The non-transitory computer-readable medium of claim 15, wherein identifying a set of SDKs that are installed in the application that initiated the request comprises:

accessing the mapping of application data to installed SDKs;

identifying, within the mapping, the application specified in the application data and a version of the application that initiated the request;

identifying the set of SDKs that are mapped to the application and the version of the application that initiated the request.

17. The non-transitory computer-readable medium of claim 16, further comprising generating the mapping of application data to installed SDKs, including:

identifying, from a response log stored in a data structure, previous responses that were previously provided to the version of the application in response to previous requests that were initiated by the version of the application;

identifying, from the previous responses, a set of multiple different SDKs that were specified in the previous responses; and mapping each SDK in the set of multiple different SDKs to the version of the application in the data structure.

18. The non-transitory computer-readable medium of claim 15, wherein transmitting the particular response to the first SDK with instructions specifying which SDK installed at the client device is required to render a digital component included in the particular response comprises transmitting instructions specifying an application program interface (API) call to render the digital component included in the particular response.

19. The non-transitory computer-readable medium of claim 15, wherein transmitting, over a network, each real-time request to a corresponding third party digital component provider comprises transmitting the particular real-time request to the particular third-party digital component provider without decrypting the encrypted data.

20. The non-transitory computer-readable medium of claim 15, wherein the operations further comprise: providing a particular custom digital component associated with the particular response for presentation by a particular SDK in an electronic document at the client device.

* * * * *

UNITED STATES PATENT AND TRADEMARK OFFICE
CERTIFICATE OF CORRECTION

PATENT NO. : 10,455,058 B2
APPLICATION NO. : 15/546442
DATED : October 22, 2019
INVENTOR(S) : Dawson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 167 days.

Signed and Sealed this
Eleventh Day of August, 2020

Andrei Iancu
*Director of the United States Patent and Trademark Office*